United States Patent
Chang

(10) Patent No.: US 8,691,042 B2
(45) Date of Patent: Apr. 8, 2014

(54) ECO ANTI-MOLD FRESH-KEEPING CHIP

(76) Inventor: Wei-Yin Chang, Taichung (TW)

( * ) Notice: Subject to any disclaimer, the term of this patent is extended or adjusted under 35 U.S.C. 154(b) by 337 days.

(21) Appl. No.: 13/240,196

(22) Filed: Sep. 22, 2011

(65) Prior Publication Data

US 2013/0078478 A1 Mar. 28, 2013

(51) Int. Cl.
*B32B 37/12* (2006.01)
*B32B 38/08* (2006.01)
*B32B 38/14* (2006.01)
*B32B 38/00* (2006.01)
*B32B 27/10* (2006.01)

(52) U.S. Cl.
CPC .............. *B32B 37/12* (2013.01); *B32B 38/08* (2013.01); *B32B 38/145* (2013.01); *B32B 27/10* (2013.01)
USPC ........................................ 156/277; 156/281

(58) Field of Classification Search
None
See application file for complete search history.

(56) References Cited

U.S. PATENT DOCUMENTS 5,417,974 A * 5/1995 Sekiyama et al. ............ 424/411

FOREIGN PATENT DOCUMENTS

WO WO 2008149232 A2 * 12/2008

* cited by examiner

*Primary Examiner* — Ramsey Zacharia
(74) *Attorney, Agent, or Firm* — Rosenberg, Klein & Lee

(57) ABSTRACT

An eco anti-mold fresh-keeping chip, a graph layer is formed on a base material after printed and a lustering film polyester layer is pasted on the graph layer by a manufacturing machine to construct a chip body, the chip body is put inside the fumigation trough with natural anti-mold fresh keeping antioxidation material, the chip body absorbs the natural antimold fresh-keeping anti-oxidation material to form an eco anti-mold fresh-keeping chip after the fumigation and permeation procedure in chamber, the main component of the natural anti-mold fresh-keeping anti-oxidation material is consisted of Allyl isothiocyanate and eucalyptol (juniper pythoncidere).

1 Claim, 3 Drawing Sheets

ECO ANTI-MOLD FRESH-KEEPING CHIP

BACKGROUND OF THE INVENTION

1. Field of the Invention

The invention relates to an eco anti-mold fresh-keeping chip, more particularly, to an anti-oxidation, anti-mold eco anti-mold fresh-keeping chip, which conforms to the environmental protection and may extend food freshness. It is mainly a graph layer formed on a base material after printed, a lustering film polyester layer is pasted on the graph layer by a manufacturing machine to construct a chip body, and the chip body is then put inside the fumigation trough with natural anti-mold fresh keeping anti-oxidation material, the chip body absorbs the natural anti-mold fresh-keeping anti-oxidation material to form an eco anti-mold fresh-keeping chip after the fumigation and permeation procedure in chamber, the PE laminated layer of the base material is setting to cover the pores of the glassine paper, the water basis adhesive above keeps constant dosage after fumigating, permeating and gasification in the chamber and the stickiness of it becomes smaller, the amount of the anti-mold components may be identified whether it saturation by the easy-removable bottom paper, the anti-mold chip may evaporate anti-mold agent to achieve the anti-mold effect after opening, the water basis adhesive restores its stickiness and the bottom paper become not easy to remove after a period of time, and the anti-mold agent may be identified as totally evaporated, thus the amount of the anti-mold components may be identified, the eco anti-mold fresh-keeping chip with identifying anti-mold components and anti-oxidation effect is formed, wherein:

the main component of the natural anti-mold fresh-keeping anti-oxidation material is consisted of Allyl isothiocyanate and eucalyptol (juniper pythoncidere)

2. Brief Description of the Related Art

In order to keep food or object fresh and prevent damp and moldy, some chemical products such as desiccant dry bags or deoxygen bags are put for restraining and anti-mold effect. However, the abovementioned conventional chemical products are not good to human body, therefore, an anti-mold chip produced by using gasification method is researched and developed in the field. For example, the anti-mold sticker of Taiwan patent number 94215658, which is mainly consisted of a release paper and a sticker, the sticker has volatilizable anti-mold composition, The sticker may be pasted inside a container by removing the release paper for convenient using, but the anti-mold component in the sticker is still chemical product, it does not have the environmental protection and identifying anti-mold effect. Therefore, the inventor developed "the eco bacteriostasis anti-mold fresh-keeping chip" of Taiwan patent number 98108754, which uses a natural material as anti-mold material. Although the chip can achieve the expected fresh-keeping effect, it cannot delay the process that food becomes yellow. Food may become yellow easily after oxidation and not looks good. Therefore, in order to meet people needs and achieve the fresh-keeping effect, the above defects may be improved to delay the process that food becomes yellow (anti-oxidation).

SUMMARY OF THE INVENTION

In view of this, after many improvements, the inventor created the eco anti-mold fresh-keeping chip, in which a graph layer is directly printed on a base material, a lustering film polyester layer is pasted on the graph layer by a manufacturing machine to construct a chip body, and the chip body is then put inside the fumigation trough with natural anti-mold fresh keeping anti-oxidation material, the chip body absorbs the natural anti-mold fresh-keeping anti-oxidation material to form an eco anti-mold fresh-keeping chip after the fumigation and permeation procedure in chamber, the PE laminated layer of the base material is setting to cover the pores of the glassine paper, the water basis adhesive above keeps constant dosage after fumigating, permeating and gasification in the chamber and the stickiness of it becomes smaller, the amount of the anti-mold components may be identified whether it saturation by the easy-removable bottom paper, the main component of the natural anti-mold fresh-keeping anti-oxidation material is consisted of Allyl isothiocyanate and eucalyptol (juniper pythoncidere) with anti-mold components and anti-oxidation effect to effectively solve the defects in the prior art.

To achieve the object, a natural fresh-keeping anti-oxidation anti-mold component is provided, synthesis of chemical components may be reduced largely by using Allyl isothiocyanate with high volatility and high concentration molecule and eucalyptol (juniper pythoncidere) with fresh-keeping anti-oxidation anti-yellow effect. Eucalyptol (juniper pythoncidere) is extracted by distillation and purification, and high density of the anti-mold component of Allyl isothiocyanate is produced by hydrolysis fermentation (Enzymolysis) extracting from the of crucifer plants. Eucalyptol (juniper pythoncidere) has capability of antibacterial, antivital, anti-mold and anti-oxidation and may extend the period of anti-mold and fresh-keeping, effectively delay the process that food becomes yellow by the anti-oxidation capability.

BRIEF DESCRIPTION OF THE DRAWINGS

The detailed structure, the applied principles, the function and the effectiveness of the present invention can be more fully understood with reference to the following description and accompanying drawings, in which.

DETAILED DESCRIPTION OF THE PREFERRED EMBODIMENTS

Figure 1:
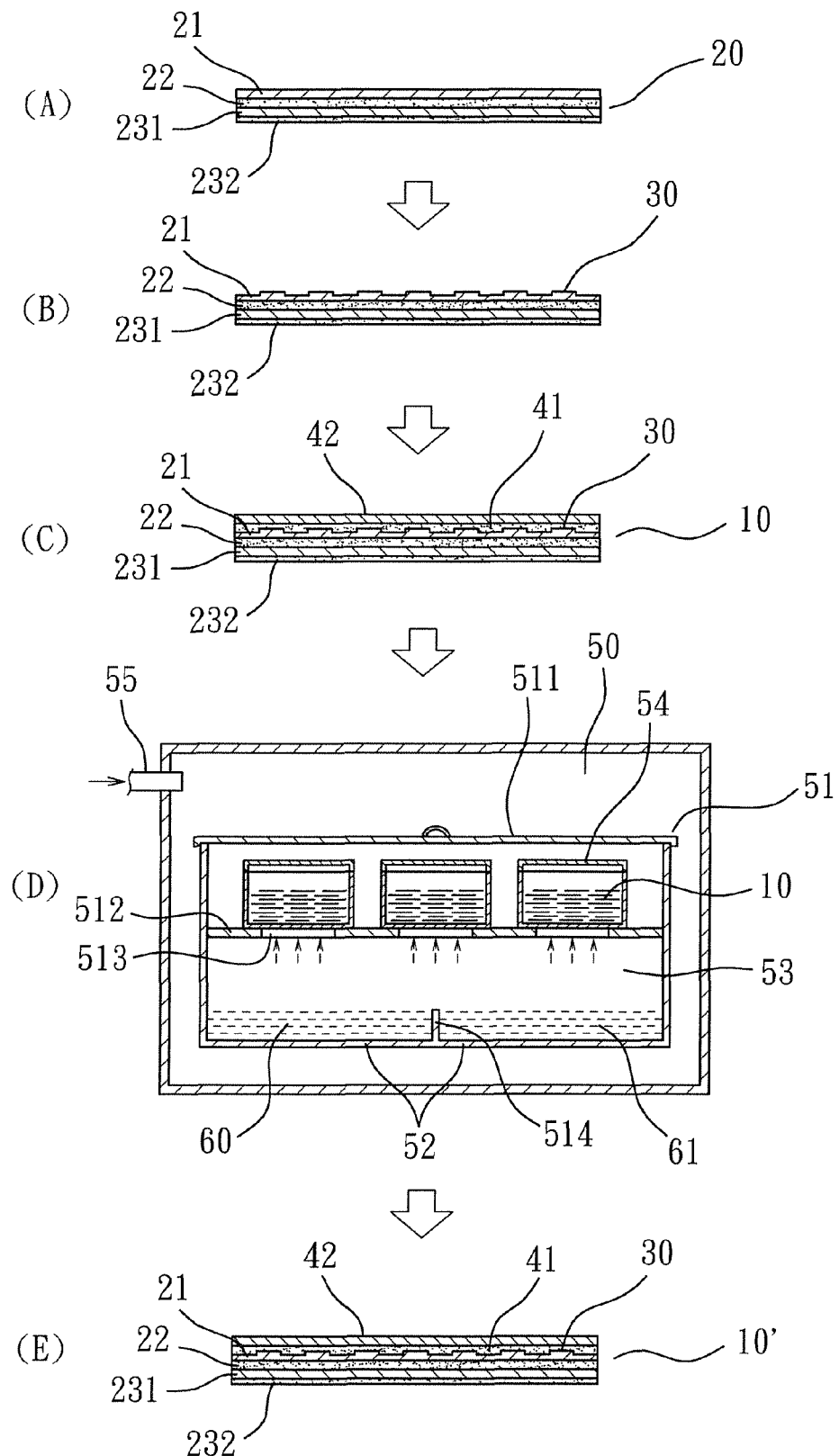
FIG. 1 is a schematic diagram of the manufacturing flow according to the present invention.

The above and further objects and novel features of the invention will more fully appear from the following detailed description when the same is read in connection with the accompanying drawing figures. It is to be expressly understood, however, that the drawings are for purposes of illustration only and is not intended to define the limits of the invention.

Figure 2:
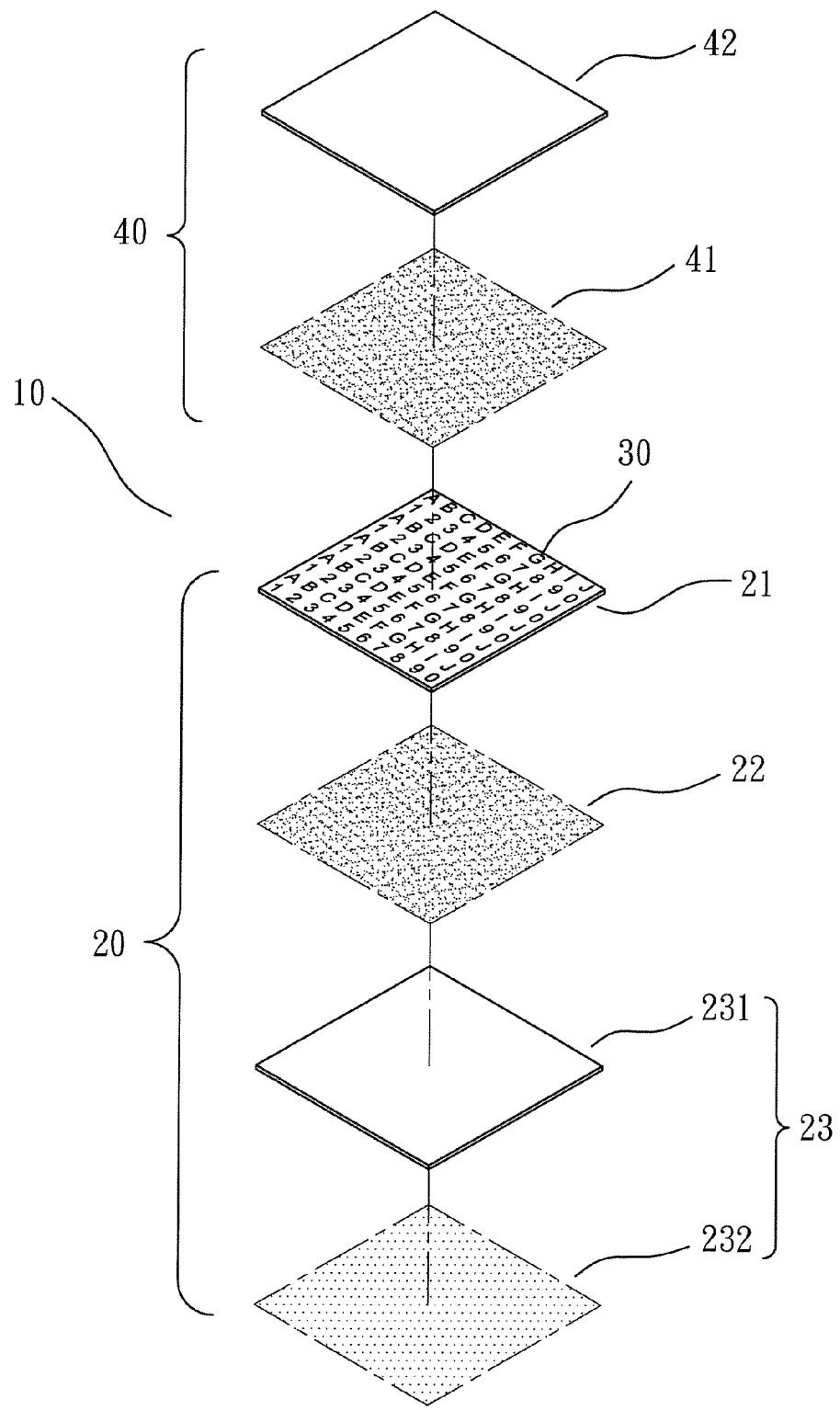
FIG. 2 is an exploded perspective view schematically illustrating the structure of the present invention.
Figure 3:
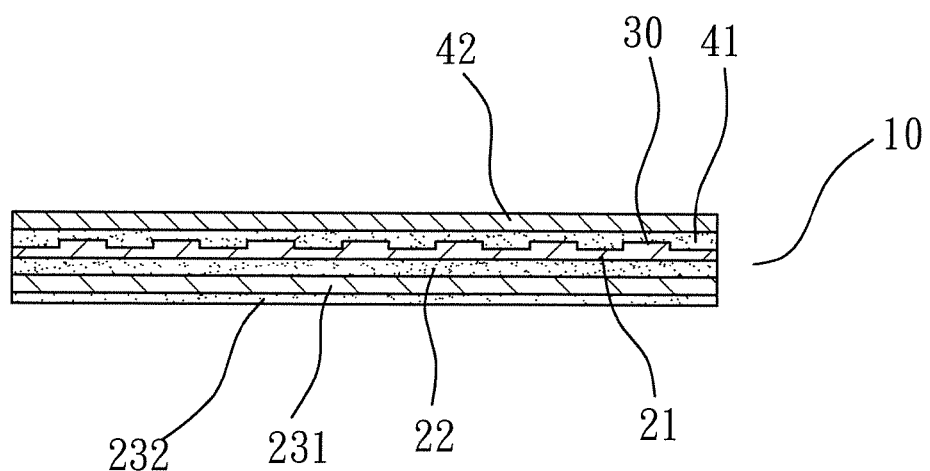
FIG. 3 is a cross-sectional diagram of one embodiment of the present invention.

For further understanding the present invention, the embodiments of the present invention are illustrated with the drawing figures as follows:

Please refer to FIG. 1 to FIG. 3, the present invention mainly includes:

(A) a base material 20, which consists of an upper paper 21 with a water based adhesive layer 22 below and a bottom paper 23, the bottom paper 23 is a glassine paper 232 with a PE laminated layer 231 set above;

(B) a graph layer 30: the graph layer 30 has printed words or figures on the base material 20;

(C) a lustering film polyester layer 40: pasting the lustering film polyester layer 40 on the base material by a manufacturing machine to form a chip body 10, the lustering film polyester layer 40 includes a lustering layer 42 on a non-plastic adhesive 41;

(D) the fumigation and permeation procedure in a chamber: putting the chip body 101 into a steam box 54 on the fumigation trough 51 in chamber 50. The fumigation trough 51 is made of a material with good heat conductivity, and a removable top cover 511 is set on the fumigation trough 51. A partition 512 is set inside the fumigation trough 51 near its central position, and multiple through holes 513 are disposed in the partition 512. The steam box 54 is put on the through holes 513, and a shelf 514 is set on the bottom of the fumigation trough to form two rooms 52 for respectively receiving therein Allyl isothiocyanate 60 and eucalyptol (juniper pythoncidere) 61 as the natural anti-mold fresh-keeping anti-oxidation material. A mixing area 53 is formed between the partition 512 and the rooms 52. A constant temperature controller 55 is set in the chamber 50 for keeping the temperature inside within 40 to 50.degree. C. Thus, the fumigation trough 51 is heated and the anti-mold fresh-keeping anti-oxidation material is heated to generate gas. The gas of Allyl isothiocyanate 60 and eucalyptol (juniper pythoncidere) 61 rises to the mixing area 53 and mixes. The chip body 10 becomes saturated, absorbing the anti-mold fresh-keeping anti-oxidation material after fumigating 50 to 70 hours. Allyl isothiocyanate 60, which is produced by purification and hydrolysis fermentation (enzymolysis) extracting the components in crucifer plants, such as Thioglycosides, isothiocyanates including high content of active chemical components, has an anti-mold effect. Its special macromolecule structure may generate high penetrability and may quickly penetrate the cell membrane of microorganisms, directly destroy DNA and digest protein, to make bacteria and mold not survive to thereby achieve disinfection effect. And the component of the eucalyptol (juniper pythoncidere) 61 has the capability of anti-oxidation, anti-yellowing, antibacterial, antiviral, anti-mold and anti-oxidation after distillation, purification and extraction.

(E) the anti-mold product: a chip body product 10' of the eco anti-mold fresh-keeping chip with identifying anti-mold components and anti-mold anti-oxidation effect results.

Such structure, except using Allyl isothiocyanate 60, which is enzymolysis extracted the anti-mold component from natural crucifer plants, eucalyptol (juniper pythoncidere) 61 with the capability of antibacterial, antiviral, anti-mold and anti-oxidation is used in the present invention. (Since the growth of juniper needs thousand years, and the essence extracted and refined from the juniper tree may have the capability of antibacterial, antiviral, anti-mold and anti-oxidation by research.) Besides, using the method of the fumigation and permeation procedure in the chamber (D), the chip body 10 may be saturated, absorbing the anti-mold fresh-keeping anti-oxidation components to thereby extend the period of anti-mold and fresh-keeping. The PE laminated layer 231 of the base material 20 covers the pores of the glassine paper 232, the water based adhesive 22 above keeps constant dosage after fumigating, permeating and gasification in the chamber and the stickiness of it becomes smaller. By way of the easy-removable bottom paper 23, the amount of anti-mold components may be identified. Therefore, the chip body 10' certainly has the capability of identifying anti-mold component, anti-mold and anti-oxidation to effectively delay the process that food becomes yellow.

Figure 4:
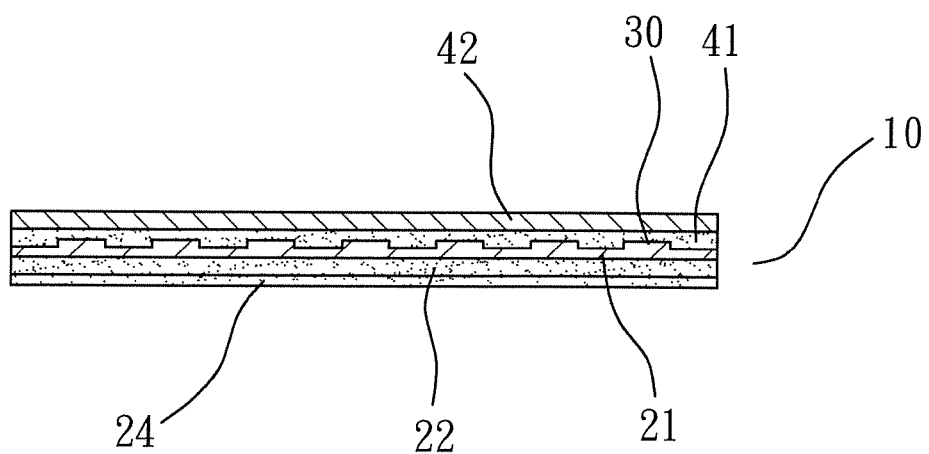
FIG. 4 is a cross-sectional diagram of another embodiment of the present invention.

Further, a high-density paper 24 may be used as the bottom paper 23 of the present invention to replace the glassine paper 232 and the PE laminated layer 231, as shown in FIG. 4.

Above all, the eco anti-mold fresh-keeping chip of the present invention has the advantages of environmental protection, natural, anti-oxidation, anti-yellow, identifying anti-mold components, and may extend freshness effectively.

I claim:

1. A manufacturing method for a eco anti-mold fresh-keeping chip having a chip body that absorbs a natural anti-mold fresh-keeping anti-oxidation material, comprising:

forming a base material the base material having a bottom paper adhered to an upper paper with a water based adhesive layer therebetween, the bottom paper being formed by a polyethylene laminated layer laminated on top of a glassine paper material, the upper paper having indicia printed thereon to define a graph layer on the base material;

pasting a lustering film polyester layer on the base material with a non-plastic adhesive by a manufacturing machine to form the chip body; and performing a fumigation and permeation procedure in a chamber so that the chip body absorbs the natural anti-mold fresh-keeping anti-oxidation material, the procedure including putting the chip body into a steam box in a fumigation trough disposed in the chamber, the fumigation trough being made of a thermally conductive material and having a removable top cover thereon, the fumigation trough having a partition disposed therein near a central position thereof, the partition having multiple through holes, formed therein and the steam box being positioned on the through holes, the fumigation trough further having a shelf set disposed on a bottom thereof to form two rooms and a mixing area being formed between the partition and the two rooms, the fumigation and permeation procedure including:

respectively adding Allyl isothiocyanate and eucalyptol (juniper pythoncidere) as the natural anti-mold fresh-keeping anti-oxidation material;

maintaining a temperature inside the chamber in a range of 40 to 50° C. with a constant temperature controller, the fumigation trough thereby being heated and vaporize the Allyl isothiocyanate and eucalyptol (juniper pythoncidere), the vapors thereof rising from the two rooms to the mixing area and mixing together thereat; and, maintaining the chip body to be saturated by absorbing the anti-mold fresh-keeping anti-oxidation material for a time period of 50 to 70 hours to form the eco anti-mold fresh-keeping chip.

\* \* \* \* \*